April 28, 1925.

S. GREENWALD

BAKER'S DOUGH BOX

Filed Dec. 15, 1924

1,535,827

INVENTOR
Sam Greenwald
BY
Harry Jacobson
ATTORNEY

Patented Apr. 28, 1925.

1,535,827

UNITED STATES PATENT OFFICE.

SAM GREENWALD, OF BROOKLYN, NEW YORK.

BAKER'S DOUGH BOX.

Application filed December 15, 1924. Serial No. 755,847.

*To all whom it may concern:*

Be it known that I, SAM GREENWALD, a citizen of the Republic of Poland, and a resident of the city of New York, borough of Brooklyn, in the county of Kings and State of New York, have invented certain new and useful Improvements in Bakers' Dough Boxes, of which the following is a specification.

This invention relates to bakers' dough boxes of that type in which unbaked goods are placed in order that the dough of which said goods are made may rise to the requisite degree before being baked into finished goods, such as rolls, bread, or the like.

It is desirable in the manufacture of certain types of rolls and bread, such as "Vienna" goods, that the entire surface of the dough be so exposed as to dry over said surface uniformly, for the reason that a product having a crust substantially the same all over the goods may result. If the unbaked goods rest on a surface which does not allow the drying of the bottom of said goods at the same rate as the remaining surface thereof, said bottom usually remains moist, with the result that the goods stick to the surface on which they rest and cannot be properly handled.

To overcome the above objection, I provide a box wherein is suitably mounted a sheet of coarsely woven or other material which allows the circulation of air therethrough to a sufficient extent to cause the bottom of the goods to dry at the same rate as the remainder of the goods. The boxes are so made that they may be readily stacked one above the other, whereby the interior of the box is shut off from the outside air, and the goods are given sufficient opportunity to rise at the proper rate to the required puffiness. The sheet on which the goods are placed is made readily detachable from its support, so that it can be kept clean and sanitary at all times.

I further provide means whereby the sheet may be quickly and easily rolled up into a dust proof compartment when not in use, so that said sheet is protected from contamination.

In the drawings, Fig. 1 is a top plan view of my improved dough box with part of the cover member broken away to show the roller.

Figure 1:
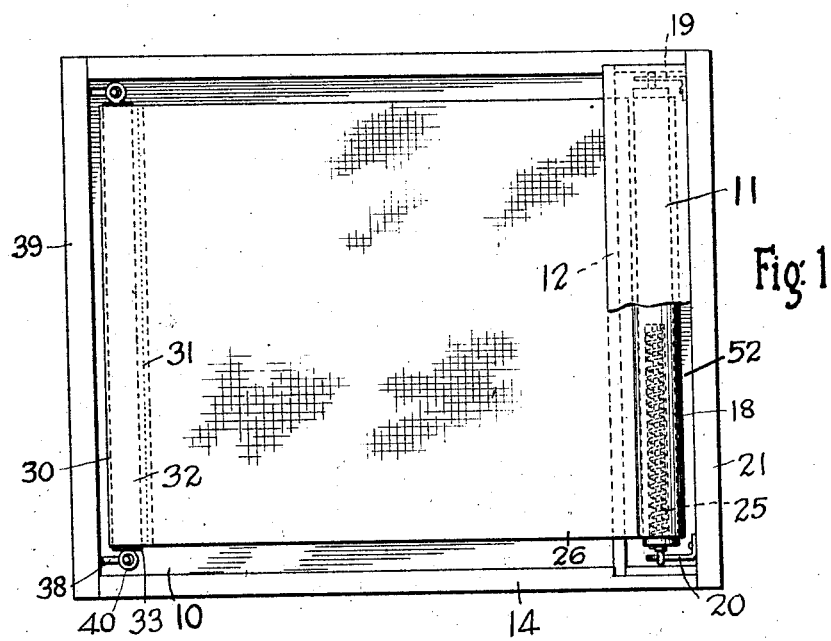
Figure 2:
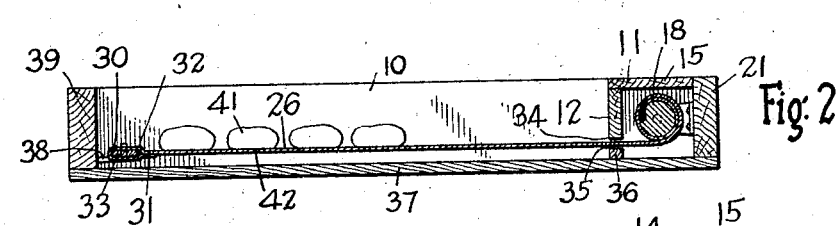
Fig. 2 is a vertical section of the same.
Figures 3, 5:
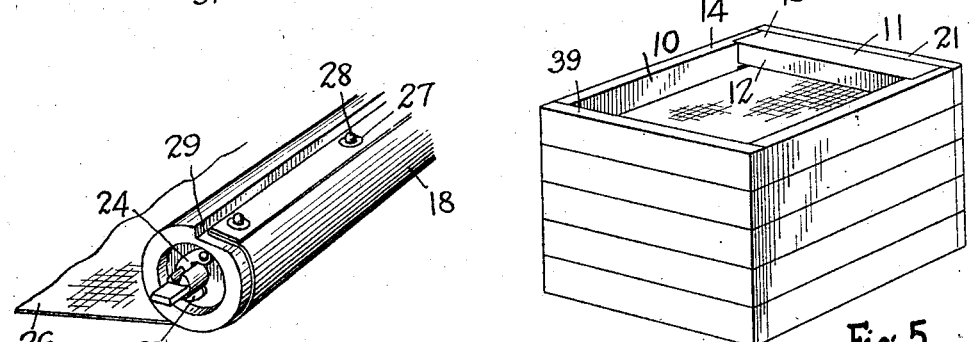
Fig. 3 is a perspective view of one end of part of the roller, showing the sheet attached thereto.
Fig. 5 is a similar view of a number of my improved boxes showing how they may be stacked.
Figure 4:
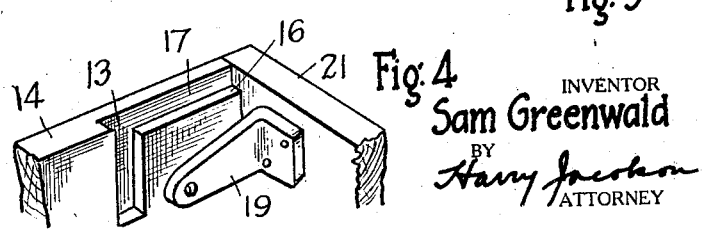
Fig. 4 is a perspective view of the interior of one corner of the box.

In the practical embodiment of my invention I provide a box 10 preferably of light, easily worked and easily handled material, such as wood, sheet metal or other suitable material, said box being provided with a removable L-shaped cover 11 at one end thereof. The ends of the upright member 12 of the cover 11 may be housed in suitable grooves as 13 in the side walls 14 of the box 10, while the member 15 of said cover rests on the ledge 16 of the depression 17 at the end of the upper edge of the walls 14. In the compartment 52 formed by said cover 11 and one end of the box 10 is mounted a roller as 18, which may be similar to the shade rollers in ordinary use, as by means of the brackets 19 and 20 secured to the rear wall 21 of the box.

A ratchet and pawl as 23 and 24 of the usual type are preferably provided at the end of the roller 18, which roller carries a spring as 25 tending to cause said roller to roll up the sheet 26 thereabout. One end of said sheet is preferably removably mounted on the roller 18, as by means of the eyelets 27 therein engaging the posts 28 of said roller. For preventing interference of the sheet with said posts, part of the roller 18 may be cut away as at 29, an amount substantially equal to the height of said posts, while the sheet 26 may be folded over and doubled along the rear end thereof to enable the eyelets 27 to be securely fastened therein. Said sheet is preferably made of coarsely woven material such as burlap or the like, which is adapted to evaporate moisture substantially as quickly as the moisture is absorbed thereby, so that goods resting thereon may dry at the bottom at substantially the same rate as the remainder of the surface thereof.

The forward end 30 of said sheet is folded rearwardly and seamed to the body of the sheet as at 31 to provide a looped portion 32 wherein a comparatively stiff member as 33 of wood or other suitable material may be inserted. The stiffener 33 is of greater thickness than the distance between the lower edge 34 of the cover member 12 and the upper edge 35 of the member 36 upstanding from the bottom 37 of the box. It will, therefore, be seen that said member 33 prevents the lower end of the sheet from entering the compartment 52, so that the forward end of said sheet is accessible at all times.

To maintain the sheet against accidental displacement in the operative position thereof, means are provided for securing the forward end 30 of said sheet to the box. Said means comprises preferably the hooks 38 secured to the front 39 of the box and the eyes 40 in the ends of the stiffener 33. To withdraw said sheet from the roller into its operative position the stiffener 33 is grasped and pulled out from said roller until the eyes 40 may be passed over the upstanding ends of the hooks 38. By inserting the eyes 40 in the ends of the stiffener 33, it will be seen that said stiffener may readily be withdrawn from the loop 32 when the sheet 26 is to be removed from the box for washing. When my improved box is used, the sheet 26 is pulled out and secured to its operative position and the unbaked goods 41 placed thereon, after which the next box is similarly filled and stacked above the previously filled box until a predetermined number of boxes are piled up. The uppermost box may, of course, be covered in any suitable manner as by means of a sheet of fabric, cardboard, or the like, not shown, to exclude exterior air therefrom while the goods are rising.

I prefer to so position the hooks 38 that the sheet 26 is spaced from the bottom 37 of the box in the operative position of said sheet. While the spacing referred to is not essential an advantage is secured thereby by reason of the free circulation of the air in the box about the sheet and the goods 41 whereby the uniform exposure of the entire surface of the goods to the air is insured.

It will be understood that after the boxes have been stacked, the stack is not disturbed until the goods have had an opportunity to rise to the proper extent after which the entire stack may be shifted on to a suitable hand truck and hauled to the oven. The goods are then removed from the boxes, turned over and placed in an oven to bake. It will be seen that the bottom 42 of each piece of goods does not stick to the sheet 26, the air in the box acting on said bottom in substantially the same manner as on the remainder of the surface of the goods, by reason of the fact that the weave and the material of the sheet 26 is such that the moisture absorbed by it is quickly evaporated, and that said bottom, therefore, dries to the same extent as the remaining surface of the goods.

It will further be seen that I have provided a convenient and sanitary means on which the goods may be placed, and that said means may readily be maintained in a clean and sanitary condition even after repeated use, and may further be removed for cleaning or replacement without loss of time, and that danger of contamination of the articles of food during the rising process is thereby eliminated.

I claim:

1. The combination with a baker's dough box, of a sheet, means for rolling up said sheet when not in use, and means for maintaining said sheet in the operative position thereof in spaced relation to the bottom of said box.

2. The combination with a baker's dough box, of a sheet, a roller, means on said sheet and said roller cooperating for removably securing one end of said sheet to said roller, and means on the other end of said sheet for securing said sheet in said box in outstretched position.

3. The combination with a baker's dough box, adapted to be arranged in a stack, of a sheet, a roller for said sheet, and a removable L-shaped cover enclosing said roller and forming a compartment, through which said sheet projects, at one end of the box.

4. The combination with a baker's dough box, having coplanar upper edges and a flat bottom for allowing a series of similar boxes to be piled in a stack, of a roller disposed at one end of said box, a cover for said roller removably joined to said box, a sheet removably attached to said roller and adapted to be rolled thereabout under said cover, and means for maintaining said sheet in outstretched operative position.

5. The combination with a baker's dough box, of a flexible fabric sheet, means for rolling up said sheet, a removable L-shaped cover for one end of said box enclosing said sheet rolling means, and means for removably securing said sheet to said rolling means.

6. The combination with a baker's dough box, of a flexible sheet of loosely woven fabric adapted to evaporate moisture readily, an enclosed spring roller mounted in said box, and means on said roller for removably engaging one end of said sheet.

7. The combination with a baker's dough box, of a spring roller, means secured to one end of said box for supporting said roller, a cover comprising a top member and a front member enclosing said roller, removably engaging the sides of said box and arranged with said top member in substantially the same plane as the upper edges of said box, said cover forming a roller compartment, and means removably attached to said roller adapted to be rolled upon and unrolled from said roller, and adapted to have moist goods placed thereon and to readily evaporate moisture.

8. The combination with a baker's dough box, of a spring roller at one end of said box, an L-shaped cover removably enclosing said roller in a compartment near said end of the box, a sheet of material adapted to readily evaporate moisture removably secured at one end thereof to said roller and projecting from said compartment, means on said sheet for preventing the free end of said sheet from entering said compartment, and means for securing said free end of said sheet in place in said box in the operative position of said sheet.

9. In a device of the character described, a substantially rectangular prismatic box having a substantially vertical and a horizontal groove in each of the sides thereof, an L-shaped cover adapted to be removably inserted into said grooves for forming a compartment in said box, a roller revolubly mounted in said compartment, and a sheet removably attached at one end thereof to said roller.

10. The combination with a flat box adapted to be stacked in a pile, of a rollable sheet adapted to evaporate moisture readily, means for rolling up said sheet revolubly mounted in said box, said sheet being removably secured to said means, and removable means arranged inside of said box for substantially enclosing said sheet rolling means.

SAM GREENWALD.